Patented July 12, 1932

1,866,727

UNITED STATES PATENT OFFICE

EDGAR A. SLAGLE, OF CRANFORD, NEW JERSEY, ASSIGNOR TO AMERICAN SMELTING AND REFINING COMPANY, OF NEW YORK, N. Y., A CORPORATION OF NEW JERSEY

PURIFICATION OF CERAMIC MATERIALS BY SODIUM CYANIDE

No Drawing.  Application filed December 26, 1930.  Serial No. 505,000.

This invention relates to the purification of ceramic materials used in the preparation of enamels, glazes and glasses, and more particularly to the removal of impurities which introduce into the finished product various objectionable shades of color.

The invention is particularly applicable to the purification of materials used in the manufacture of enamels, as for example, white enamels in which traces of color are particularly objectionable.

The invention further consists in the new and novel features of operation and the new and original arrangements and combinations of steps in the process hereinafter described and more particularly set forth in the claims.

Although the novel features which are believed to be characteristic of this invention will be particularly pointed out in the claims appended hereto, the invention itself, as to its objects and advantages, the mode of its operation and the mannner of its organization may be better understood by referring to the following description in which a particular commercial embodiment thereof is disclosed. It will be understood, however, that the processes and the steps thereof may be modified in various respects without departing from the broad spirit and scope of the invention.

In the following description and in the claims the various steps in the process and the details comprising the invention will be identified by specific names for convenience but they are intended to be as generic in their application as the art will permit.

The present process utilizes the fact that certain metals form cyanides or double cyanides which are soluble in water. Examples of such metals are lead, mercury, arsenic, tin, bismuth, cadmium, copper, aluminum, iron, cobalt, nickel, zinc, manganese, silver and gold. Also many of the oxides of the metals are soluble in certain cyanides, such as sodium cyanides, and certain insoluble salts of the metals become soluble as complex cyanides.

Certain metals, oxides and salts, when present even to the extent of several percent, have no coloring effect on the finished product. Others may have a pronounced effect when present to the extent of only one-thousandth of one percent. In some cases an impurity having no effect when present alone is colloidally dispersed in a second impurity which also when present alone would be harmless, and pronounced shades result from the dispersion. Hence, it may be possible to remove one impurity which functions as a dispersing agent for another impurity and thereby prevent the second impurity from remaining in the condition of a colloidal dispersion whereby it will have no detrimental effect on the finished product even though it has not been removed therefrom.

The present invention will be particularly described as applied to the removal of various impurities from sodium antimonate which is used as an opacifying agent in white enamels. This material may be obtained from metallic antimony and sodium hydroxide or may be obtained as a by-product in lead softening or in other well known manners and contains various impurities which introduce objectionable shades of color into the finished white enamel.

These impurities are removed in accordance with the present invention by leaching the antimonate with a cyanide solution, such as sodium cyanide, which is capable of dissolving the undesired metals or rendering them harmless in the manner outlined above.

In carrying out this process sodium cyanide, either as a water solution or in the solid form, may be added to a mixture comprising approximately equal parts of weight of sodium antimonate and water. The mixture is then stirred for a sufficient length of time to permit the leaching action to be completed, as for example, three hours, after which the product is allowed to settle and may be decanted or filtered. The decanted liquid or filtrate may be found to be colored yellowish, the intensity of color depending upon the amount of impurities originally present.

It is obvious that the ratio of water to solid can be varied within wide limits and also that the extraction can be carried out at elevated temperatures or at room temperature.

If the sodium antimonate is obtained as a by-product from lead softening it may contain some sodium hydroxide which imparts an alkalinity capable of retarding the hydrolysis of the sodium cyanide and lessening the loss of hydrocyanic acid. If the solution is not alkaline a small amount of alkali may be added for this purpose and will facilitate the leaching operation.

In carrying out the process the liquid should not be allowed to stand for more than a reasonable length of time in contact with the sodium antimonate as certain complex cyanides tend to decompose and pass out of the solution again contaminating the product. It is preferable to decant or filter the cyanide solution as soon as the solid material is settled which may require from 12 to 24 hours.

As a specific example of the effectiveness of the present process a sample of sodium antimonate was used as an opacifying agent in the preparation of a white glaze. The resulting glaze was discolored to a chocolate brown color. The sodium antimonate was then washed with 4% of sodium cyanide and a cream color glaze resulted. When the antimonate was again washed with an additional 2% of sodium cyanide it produced a pure white glaze.

As a further example, a sample of sodium antimonate produced an enamel so nearly white that the difference was only noticeable with a close comparison with a standard, but was sufficiently great to render the same unsuitable for the market. The sodium antimonate was then treated with .8% of sodium cyanide after which it produced a pure white enamel equal to the standard.

Although the above process has been particularly described as applied to the purification of sodium antimonate it is to be understood that it is equally applicable to calcium stannate other ceramic materials containing impurities which are soluble in cyanide solutions. It is also obvious that potassium cyanide or other water soluble cyanide may be used as the leaching agent.

Although certain novel features of the invention have been shown and described and are pointed out in the annexed claims, it will be understood that various omissions, substitutions and changes in the several steps of the process and in its operation may be made by those skilled in the art without departing from the spirit of the invention.

What is claimed is:

1. The process of purifying opacifying agents used in enamels, glazes and glasses to remove impurities therefrom which are capable of introducing an undesirable color into the finished product which comprises treating said opacifying agents with a cyanide solution whereby the undesirable materials are dissolved and separated therefrom, and then removing the opacifying agents from the solution.

2. The process of treating opacifying agents used in enamels, glazes and glasses for the removal of impurities therefrom which would be capable of introducing undesirable colors into the finished product which comprises forming a mixture of said opacifying agent and water and adding thereto a cyanide and causing an intimate mixture between the cyanide and said opacifying agent whereby impurities are dissolved therefrom and then separating the ceramic material and the cyanide solution.

3. The process of purifying sodium antimonate to remove impurities therefrom which would be harmful in the production of enamels, glazes and glasses which comprises treating said sodium antimonate with a cyanide solution for a sufficient period of time to extract the undesired impurities, and separating the antimonate from said solution.

4. The process of purifying sodium antimonate to remove impurities therefrom which would be harmful in the production of enamels, glazes and glasses which comprises leaching said sodium antimonate in a cyanide solution for a sufficient period of time to extract the undesired impurities, and separating the antimonate from said solution.

5. The process of purifying sodium antimonate to remove impurities therefrom which would be harmful in the production of enamels, glazes and glasses which comprises leaching said sodium antimonate in a sodium cyanide solution for a sufficient period of time to extract the undesired impurities, and separating the antimonate from said solution.

6. The process of purifying sodium antimonate for use in ceramics which comprises adding sodium cyanide to a mixture of sodium antimonate and water, stirring to effect an intimate contact, allowing the antimonate to settle and decanting the cyanide solution.

7. The process of purifying sodium antimonate to render the same suitable for ceramics which comprises leaching said antimonate with sodium cyanide in the presence of a sufficient amount of alkali to retard the hydrolysis of the cyanide.

8. The process of purifying sodium antimonate which comprises leaching the same with sodium cyanide in the presence of an amount of sodium hydroxide sufficient to impart an alkalinity to the solution and to retard the hydrolysis of the cyanide.

9. The process of purifying an opacifying agent used in enamels, glazes and glasses to remove undesirable impurities which comprises leaching said opacifying agent in an alkaline cyanide solution.

10. The process of purifying an opacifying agent used in enamels, glazes and glasses to remove undesirable impurities which comprises leaching said opacifying agent in an alkaline solution of sodium cyanide.

11. The process of purifying an opacifying agent used in enamels, glazes and glasses to remove undesirable impurities which comprises leaching said opacifying agent in a solution of sodium cyanide.

12. The process of purifying an opacifying agent used in enamels, glazes and glasses to remove undesirable impurities which comprises leaching said opacifying agent in a cyanide solution.

In testimony whereof I have hereunto set my hand.

EDGAR A. SLAGLE.